United States Patent [19]

Wen

[11] Patent Number: 4,825,464

[45] Date of Patent: Apr. 25, 1989

[54] SUCCESSIVE KEY OPERATING MECHANISM FOR TELEPHONE DIALING

[75] Inventor: Sayling Wen, Taipei, Taiwan

[73] Assignee: Inventa Electronic Co., Ltd., Taipei, Taiwan

[21] Appl. No.: 133,308

[22] Filed: Dec. 16, 1987

[51] Int. Cl.⁴ .......................................... H04M 1/272
[52] U.S. Cl. ..................................... 379/354; 379/368
[58] Field of Search ................ 379/156, 354, 361, 368

[56] References Cited

U.S. PATENT DOCUMENTS 4,304,968 12/1981 Klausner et al. ..................... 379/354
4,511,764 4/1985 Nakayama et al. .................. 379/354

Primary Examiner—Stafford D. Schreyer
Attorney, Agent, or Firm—Ladas & Parry

[57] ABSTRACT

Described herein is a circulatory operation for entering information into a memory of a telephone device. The operation consists of alphabetical and numeric co-characters, which may be selectively entered into a memory by successively pressing a single key to select the proper character. Each key is associated with a counter connected with a decoder for providing an output to enable the key. A pair of latches coupled with the keys and a control device acts to temporarily latch the keyed input data information for output thereof. A frequency generating device is also connected to the counter to provide a key scanning signal. Memory device coupled with an enabling key through a flip/flop circuit are used to store the keyed input data information and provide a key code therefrom. A comparator is also included between the latches and memory device for comparing input data information from the latches and outputting the compared key information therefrom.

12 Claims, 9 Drawing Sheets

SUCCESSIVE KEY OPERATING MECHANISM FOR TELEPHONE DIALING

BACKGROUND OF THE INVENTION

This invention relates to an input device for key telephone sets, and more particularly to a type of input device by which alphabetical letters and numerals can be alternatively keyed in through an improved input means for dialing purpose.

One kind of conventional keyboard for key telephone sets is as shown in FIG. 1, wherein 10 numeral keys and 2 function keys are arranged in 3×4 keyboard.

Another kind of conventional keyboard for key telephone sets is as shown in FIG. 2, wherein English letters are incoporated into the numeral keys, such as that normally used in most northern American countries.

Telephone calls are usually made using telephone numbers which are generally formed in a group of designated digits. Therefore, numerals are the main input data and have been considered standard form for key telephone sets. As to how English alphabetical letters are also used as input so as to promote the function of the key telephone sets, no significant improvement has ever been made in the field. Two examples with English alphanumeric input are known as follows:

(1) The U.S. A T & T Corporation has made known a Genesis multi-functional telephone set for which a separate keyboard having a set of English alphabet keys provided beside the ordinary push-button keys, as shown in FIG. 3, so as to assist the user in matching an English name of the called party with the telephone number and making a phone call using a personal name.

(2) Another example is as shown in FIG. 4 wherein a LEFT key (L), a MEDIUM key (M), a RIGHT key (R), etc. are provided along with an ordinary keyboard used in the key telephone system adopted in northern American countries. Operations of this example, which may be called a "position selective input method for English letters," are as follows:

Keying  representing numeral "2";

Keying  and  representing letter "A";

Keying  and  representing letter "B"; and

Keying  and  representing letter "G".

In the first example, since a separate keyboard for English letters is required to work together with the original push-button keys, a large keyboard has to be provide in the key telephone system, making the telephone set bulky and also expensive.

Although the second example is more economical in structure than the first one, it is inconvenient for the user to perform the complicated keying operations because each letter is entered by operating two different keys; therefore, the user has to shift his finger frequently over the keyboard when making a telephone call.

SUMMARY OF THE INVENTION

It is accordingly a primary object of this invention to provide an input device for key telephone sets with an improved keyboard arrangement and the associated circuit means so as to overcome the problems suffered by the prior art.

This and other objects of the present invention are met by the provision of an input device which includes: an improved keyboard having ordinary numeral and alphnumeric push-button keys such as that provided in a key telephone set; a plurality of function keys and a display unit fuctionally disposed in conjunction with the push button keys for controlling input operations and displaying input data information; an input mode indicator provided in the display units for indicating an input mode therewith; and a circuit means disposed in the keyboard and electrically coupled with all the push button keys and the funcion keys for effecting input operations. The circuit means is mainly composed of a plurality of latch circuits for temporarily storing the input data from the keyboard, a comparator circuit for comparing the data stored in the latch circuits and outputting the result therefrom, a plurality of counter circuits coupled with the comparator circuit for counting the keyed input times and locations and a display circuit coupled with the counter circuits for displaying the keyed input data. Alternatively, the circuit means can be arranged with a microprocessing unit and some peripheral devices for achieving the same input operations as mentioned above.

Other features and characteristics of the present invention will become clear from the detailed description of a preferred embodiment of an input device for key telephone sets when read in conjunction with the accompanying drawings.

BRIEF DESCRIPTION OF THE DRAWINGS

FIG. 1 is an illustration of a known keyboard for key telephone sets;

FIG. 2 is an illustration of a known keyboard used in northern American countries for key telephone sets;

FIG. 3 is a representation of a known keyboard combined with an English alphabet keyboard and a digital keyboard for key telephone sets;

FIG. 6A is an enlarged view of the frequency device shown in FIG. 6;

DETAILED DESCRIPTION OF THE PREFERRED EMBODIMENT

Figure 4:
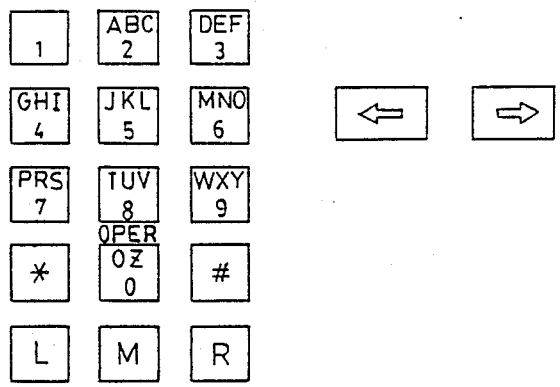
FIG. 4 is a representation of a known keyboard combined of a plurality of position selection keys and ordinary push-button keys for key telephone sets.
Figure 5:
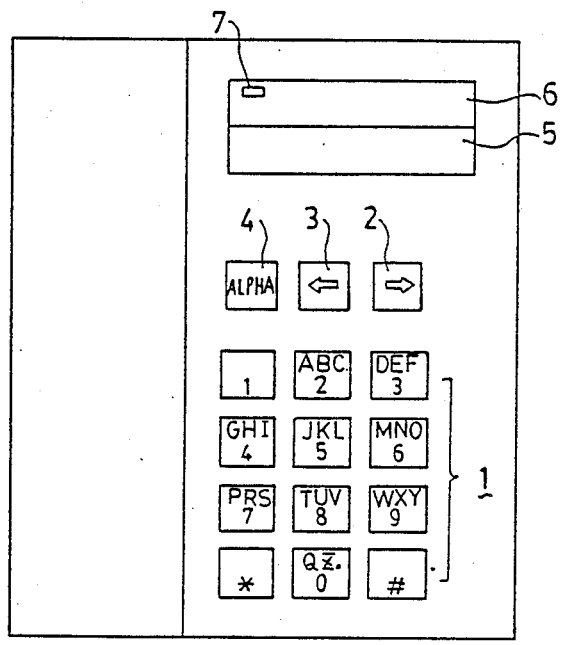
FIG. 5 is an illustrative view of a keyboard of the input device for key telephone sets according to this invention.

Referring to FIG. 5, there is shown a preferred example of a keyboard of the input device for key telephone sets according to this invention, in which the keyboard includes a push-button key arrangement 1, a plurality of function keys composed of a right shift key 2, a left shift key 3 and an alphanumeric key 4, an alphanumeric display 5 and a digital display 6 matched with an input mode indicator 7.

As can be seen in FIG. 5, the push-button key arrangement 1 is generally similar to that of the keyboard in the key telephone sets used in northern American countries except that the originally printed two letters "Q", "Z" and a period "." are disposed on the key "0" (it shall be appreciated that the two letters "Q" and "Z" and the period "." can also be disposed on the key "*" or the key "" as required). With this configuration of the keyboard, each key can represent four datums as listed in the following table:

| KEY | DATA REPRESENTED |
|---|---|
| 1 | 1 |
| ABC 2 | A, B, C, 2 |
| DEF 3 | D, E, F, 3 |
| GHI 4 | G, H, I, 4 |
| JKL 5 | J, K, L, 5 |
| MNO 6 | M, N, O, 6 |
| PRS 7 | P, R, S, 7 |
| TUV 8 | T, U, V, 8 |
| WXY 9 | W, X, Y, 9 |
| OPER QZ. 0 | Q, Z, ., 0 |

The entry selection of the above-listed keys is performed by using a "circulatory" input method, i.e. when only numerals are used for dialing, each key is pressed one time, and there will be no alphabetical entry effected; however, when alphabetical letters and numerals are to be entered at the same time, each letter-marked key is pressed one or several times to respectively represent the letters and numerals in sequence, i.e. when a key is pressed one time, it represents the first letter marked thereon; when the same key is pressed two times, it represents the second letter; pressed three times, represents the third letter; pressed four times, represents the numeral; pressed five times, it "circulates" back to represent the first letter; ... etc.

Take key [DEF 3] as an example,

| KEYING | DATA REPRESENTED |
|---|---|
| [DEF 3] | D |
| [DEF 3] [DEF 3] | E |
| [DEF 3] [DEF 3] [DEF 3] | F |
| [DEF 3] [DEF 3] [DEF 3] [DEF 3] | 3 |
| [DEF 3] [DEF 3] [DEF 3] [DEF 3] [DEF 3] | D |

Shown above is one type (TYPE A) of input operation where alphabetical letters and numerals are presented at the same time. Meanwhile, there is another type (TYPE B) of input operation in which only alphabetical letters are presented.

Take the key [DEF 3] as an example:

| KEYING | DATA REPRESENTED |
|---|---|
| [DEF 3] | D |
| [DEF 3] [DEF 3] | E |
| [DEF 3] [DEF 3] [DEF 3] | F |
| [DEF 3] [DEF 3] [DEF 3] [DEF 3] | D |

The difference between these two types of input operations is determined by the operation of the function key ALPHA 4. In normal operation, if only numerals are to be used, just leave the function key ALPHA 4 untouched, and all the keys of the push-button arrangement 1 will be operated as the ordinary numeral keys. However, if alphabetical letters and numerals are to be used at the same time, function key ALPHA 4 is operated and the results are as respectively shown in the first type (TYPE A) and the second type TYPE B) of the input operations.

In addition, since the input data are usually not formed in alphabetical order, the function keys of the right shift key ⇥ 2 and left shift key ⇤ 3 are used either to move the input mode indicator 7 for making correction or to add a space in the input data. Examples are as follows:

15, a flip-flop 33 connected with the function key ALPHA 4, a position counter 39 connected between the shift keys 2, 3 and comparator 27.

Figure 6:
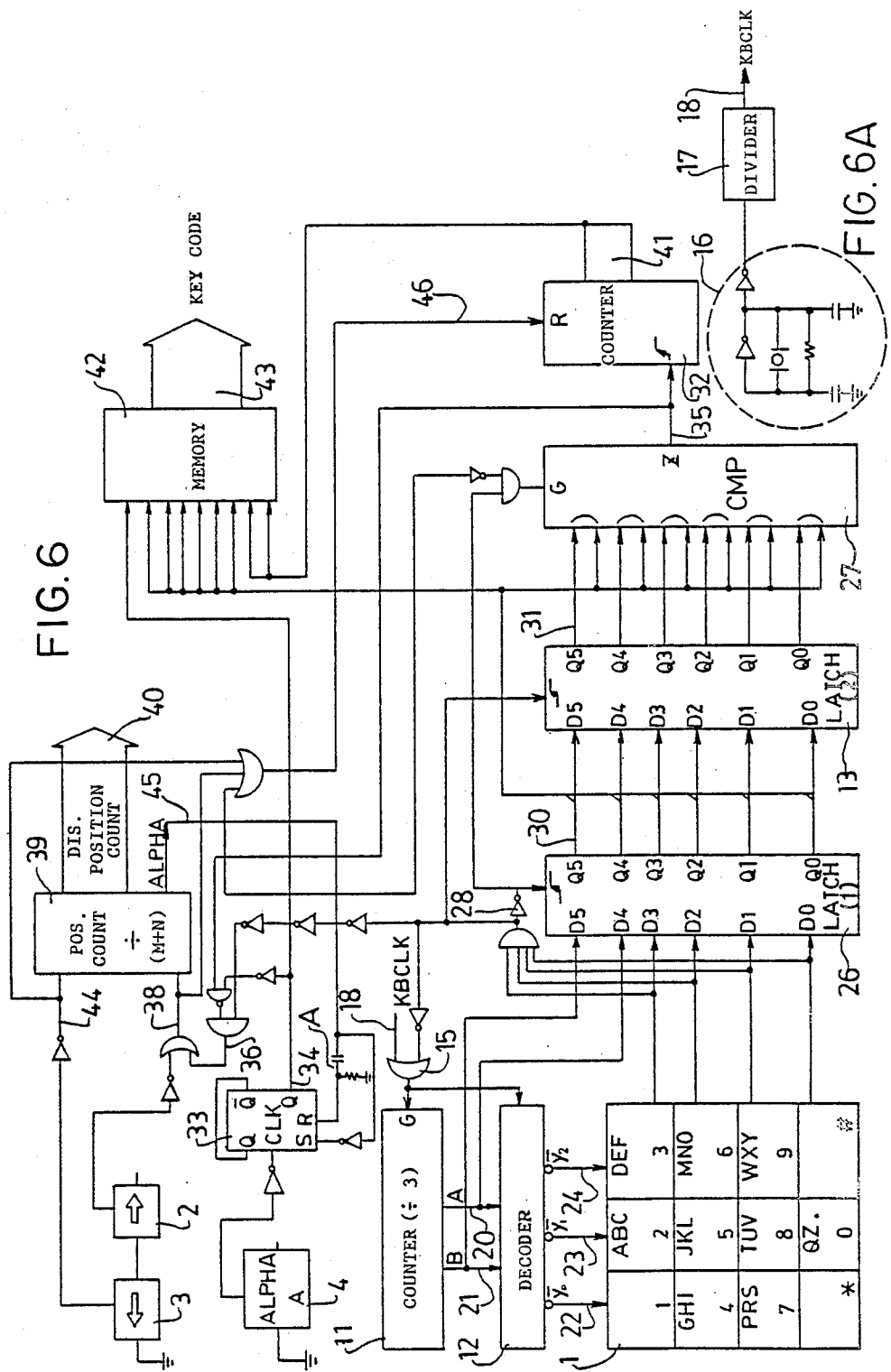
FIG. 6 is a circuit diagram of a preferred embodiment of an input device for key telephone sets according to this invention.

As shown in FIG. 6, signal wave forms produced by frequency generator 16 are transformed into keying scanning signals (KBCLK) 18 through divider 17 and

| INPUT DATA | KEYING METHOD A | KEYING METHOD B |
|---|---|---|
| (a) 123 | (num. mode) [1] [2] [3] | (num. mode) [1] [2] [3] |
| (b) JACK | [ALPHA] [JKL 5] (J) [ABC 2] (A) [→] (position shift) [ABC 2] [ABC 2] [ABC 2] (C) [JKL 5] [JKL 5] (K) | [ALPHA] [JKL 5] (J) [ABC 2] (A) [→] (position shift) [ABC 2] [ABC 2] [ABC 2] (C) [JKL 5] [JKL 5] (J) |
| (c) 4 | [GHI 4] [GHI 4] [GHI 4] [GHI 4] (4) | [ALPHA] [GHI 4] (4) |

In the "circulatory" input method, the use of the right shift ⇥ key 2 and the left shift ⇤ key 3 is not only to move the input mode indicator 7 but also to separate two successive letters in the same key. As the "AC" in the input data "JACK" above, if the right shift key 2 is not used, the two letters "A" and "C" cannot be input in succession.

In the above-mentioned input operations, the input alphanumeric data can be indicated on a display for the user to check the input. In addition, an indicating signal can also be set for denoting the input mode, such as the input operation of type A above, when the indicating signal is lit, it indicates an alphanumerical input mode while when the indicating signal is not lit, it indicates a numeral input mode.

In addition, alphanumeric display 5 and digit display 6 according to this invention can also be automatically arranged to provide the user with an input selection without operating the funcion key ALPHA 4. In this condition, when alphanumeral display 5 is enabled, input operation is made only in alphabetical letters; whereas, when digital display 6 is enabled, only numerals can be input.

Figure 7:
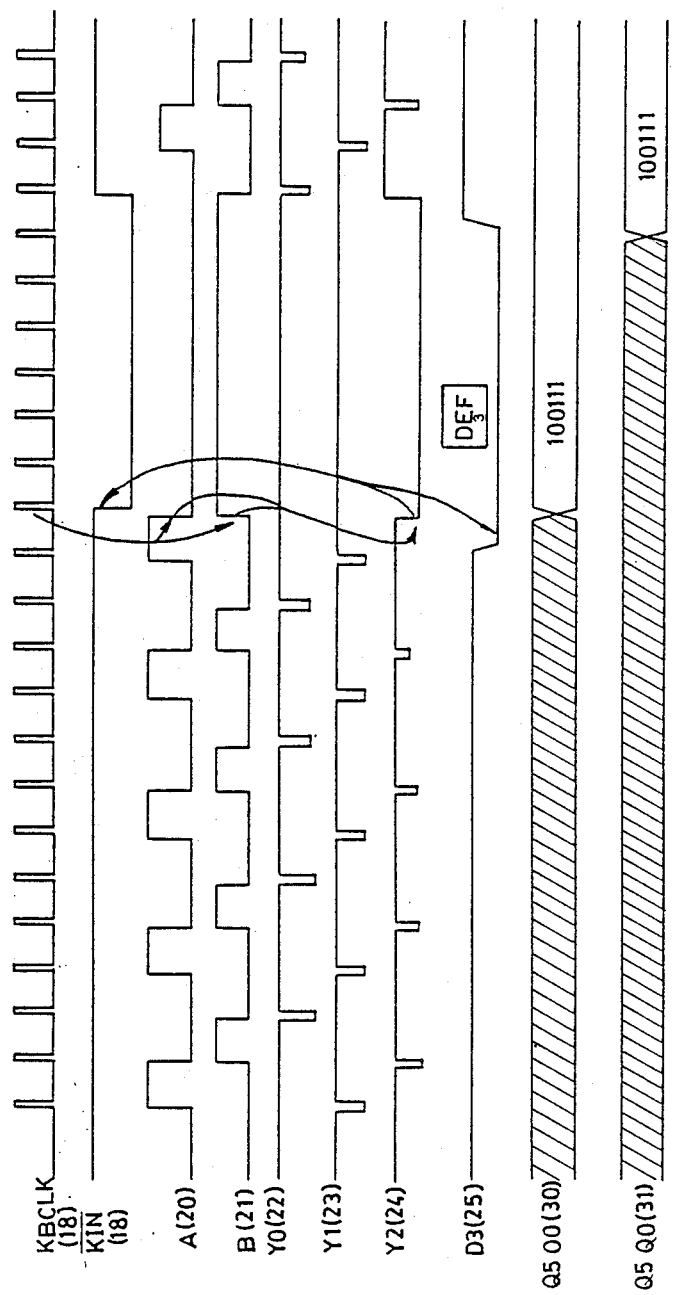
FIGS. 7 and 8 are timing diagrams of FIG. 6.

Referring to FIG. 6, there is shown a preferred embodiment of a circuit means for performing the "circulatory" input operations of the input device according to this invention, which circuit means is mainly composed of a memory unit 42, a first latch 26 and a second latch 13 coupledb between keyboard 1 and a comparator 27 which is connected to memory 42, a first counter 11 and a decoder 12 connected with keyboard 1 and the first latch 26, a frequency generator 16 and a divider 17b coupled with the first counter 11 through an AND gate sent to the first counter 11 via AND gate 15. The keying scanning signals KBCLK in the first counter 11 are divided by 3 and fed into decoder 12 as an output enable, and signals produced therefrom are as shown in FIG. 7. When key

[DEF 3]

is pressed down, signal $\overline{KIN}$ (19) becomes low, causing the value of the first counter 11 to remain unchanged, and the input values of D5, D4, D3, D2, D1, D0 of the first latch 26, are 1, 0, 0, 1, 1, 1. In this condition, the values of the inputs D5, D4, D3, D2, D1, D0 for each key when being pressed down in singles are as follows:

| KEYING | D5 | D4 | D3 | D2 | D1 | D0 |
|---|---|---|---|---|---|---|
| [1] | 0 | 0 | 0 | 1 | 1 | 1 |
| [ABC 2] | 0 | 1 | 0 | 1 | 1 | 1 |
| [DEF 3] | 1 | 0 | 0 | 1 | 1 | 1 |
| [GHI 4] | 0 | 0 | 1 | 0 | 1 | 1 |

-continued

| KEYING | D5 | D4 | D3 | D2 | D1 | D0 |
|---|---|---|---|---|---|---|
| JKL 5 | 0 | 1 | 1 | 0 | 1 | 1 |
| MNO 6 | 1 | 0 | 1 | 0 | 1 | 1 |
| PRS 7 | 0 | 0 | 1 | 1 | 0 | 1 |
| TUV 8 | 0 | 1 | 1 | 1 | 0 | 1 |
| WXY 9 | 1 | 0 | 1 | 1 | 0 | 1 |
| * | 0 | 0 | 1 | 1 | 1 | 0 |
| QZ. 0 | 0 | 1 | 1 | 1 | 1 | 0 |
| # | 1 | 0 | 1 | 1 | 1 | 0 |

Since signal KIN is changed from a high level to a low level after key

[DEF 3]

is being pressed down, this low signal $\overline{KIN}$ is impressed across inverter 28 and become a high output therefrom, causing the input values of D5, D4, D3, D2, D1 to be latched at the outputs Q5, Q4, Q3, Q2, Q1 of the first latch 26. Upon key

[DEF 3]

being released, the output values of the first latch 26 are latched in the second latch 13.

As shown in FIGS. 5 and 6, function key ALPHA 4 is an input mode transferring key, and the Q value 34 of flip-flop 33 is an input mode indication. When the Q value 34 is at a high level, it indicates that the input mode is set for numerals while when the Q value 34 is at a low level, it indicates the alphanumeric input mode.

Figure 8:
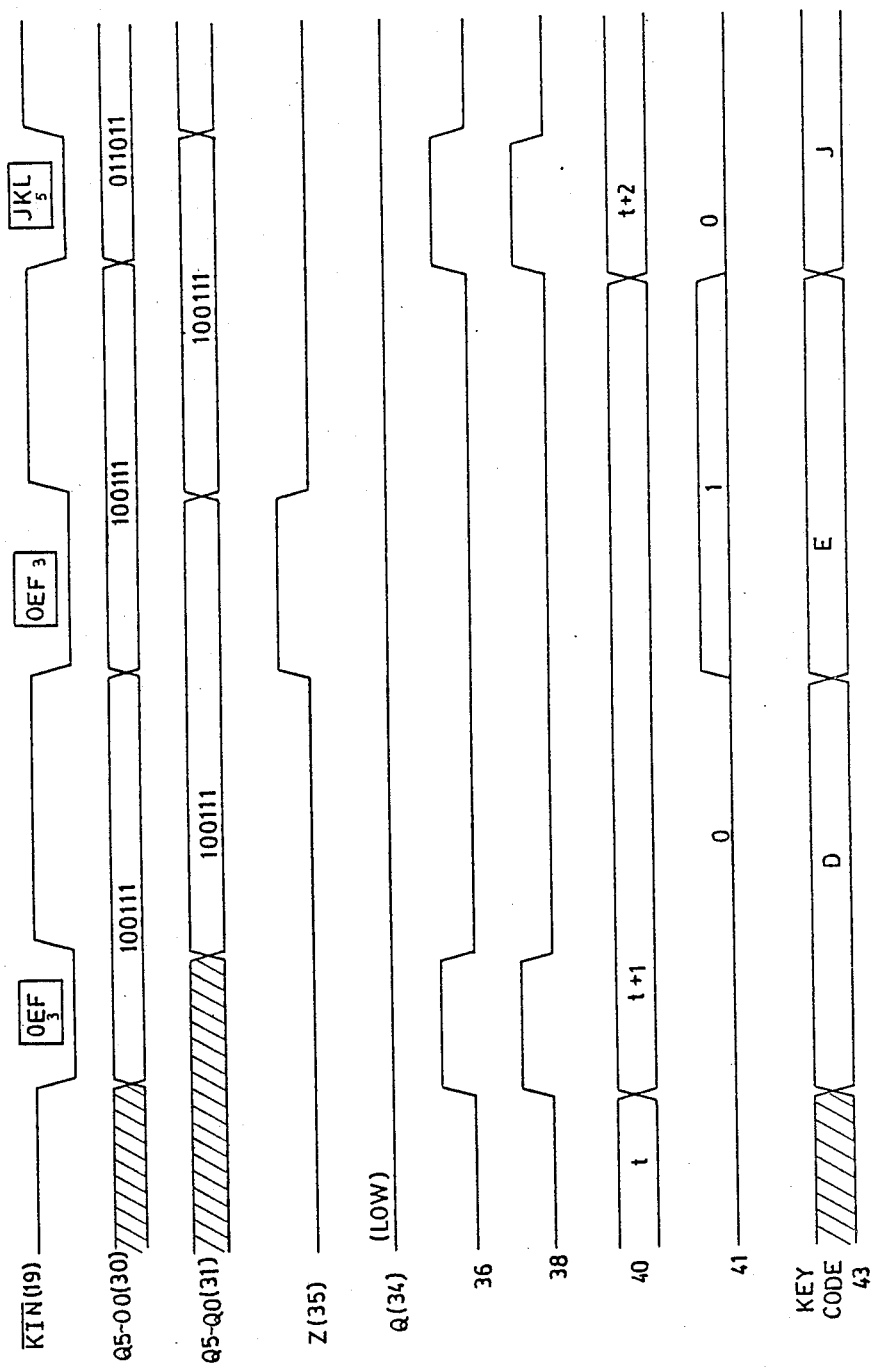

Referring to FIGS. 6 and 8, when the input device is set at an alphanumeric input mode, Q value 34 is low as shown in FIG. 8, and when key

[DEF 3]

is being pressed down, with the signal $\overline{KIN}$ being at a low level, the output value (Q5—Q0) 30 of the first latch 26 and the output value (Q5—Q0) 31 of the second latch 13 are fed into comparator 27 for being compared therein. If the two values are in agreement, the output Z (35) of comparator 27 will be high and impressed acrossed the input of the second counter 32. As can be seen in FIGS. 6, and 8, signal 36 is a forward index signal in paralell with the output signal of the right shift key 2. When the device is set at alphanumeric input mode, if key

[DEF 3]

is successively pressed down two times, only the first one press will produce a rising edge at signal pulse 36 and no rising edge will be present at the second press, i.e. the second pressing down of the same key has not caused the value of position counter 39 to increase, and the output 40 of the position counter 39 remains unchanged. Under this condition, the input mode indicator 7 is kept at the same position in display until the next key

[JKL 5]

is pressed down, and the output value 40 of the position is increased.

Now, referring back to the output Z (35) of comparator 27, if a key is repeatedly pressed, every time the same key is pressed down, there will be a rising edge appearing at the output pulse 35 of comparator 27 and causing the value of counter 32 to add 1 until 3 times are added, and then back to 0 when the following 1 is added. At this time, if the output value of position counter 39 is triggered to change by a positive edge of the output signal pulse 38 of the right shift key 2 or the output signal pulse 44 of the left shift key 3, the value of the second counter 32 will be cleared to 0, and its output value 41 will be 0. 1, 0 of which the "1" is produced by the pressing down of key

[DEF 3], and upon the pressing down of key

[JKL 5], it returns to 0.

When the values of both the output signal 30 from the first latch 26 and the output signal 41 from the second counter 32 are used as the input signals of memory unit 42, the output key codes 43 of memory unit 42 are obtained on the basis of the output signals 30 and 41, and the corresponding relationship is as follows:

| VAL. OF SIG. 30 | | | | | | VAL. OF SIG. 34 = 0 VAL. OF SIG. 41 | | | | VAL. OF SIG. 34 = 1 VAL. OF SIG. 41 |
|---|---|---|---|---|---|---|---|---|---|---|
| D5 | D4 | D3 | D2 | D1 | D0 | 0 | 1 | 2 | 3 | 0 |
| 0 | 0 | 0 | 1 | 1 | 1 | 1 | 1 | 1 | 1 | 1 |
| 0 | 1 | 0 | 1 | 1 | 1 | A | B | C | 2 | 2 |
| 1 | 1 | 0 | 1 | 1 | 1 | D | E | F | 3 | 3 |
| 0 | 0 | 1 | 0 | 1 | 1 | G | H | I | 4 | 4 |
| 0 | 1 | 1 | 0 | 1 | 1 | J | K | L | 5 | 5 |
| 0 | 0 | 1 | 1 | 0 | 1 | M | N | O | 6 | 6 |
| 0 | 0 | 1 | 1 | 0 | 1 | P | R | S | 7 | 7 |
| 0 | 1 | 1 | 1 | 0 | 1 | T | U | V | 8 | 8 |

-continued

| VAL. OF SIG. 30 | | | | | | VAL. OF SIG. 34 = 0 VAL. OF SIG. 41 | | | | VAL. OF SIG. 34 = 1 VAL. OF SIG. 41 |
|---|---|---|---|---|---|---|---|---|---|---|
| D5 | D4 | D3 | D2 | D1 | D0 | 0 | 1 | 2 | 3 | 0 |
| 1 | 0 | 1 | 1 | 0 | 1 | W | X | Y | 9 | 9 |
| 0 | 0 | 1 | 1 | 1 | 0 | * | * | * | * | * |
| 0 | 1 | 1 | 1 | 1 | 0 | Q | Z | . | 0 | 0 |
| 1 | 0 | 1 | 1 | 1 | 0 | # | # | # | # | # |
| OTHERS | | | | | | — | — | — | — | — |
| | | | | | | KEY CODE | | | | |

From the output 40 of the position counter 39 and the key codes 43, an input data will be indicated on a certain location of the display units (5 or 6) for achieving the input operations.

As described hereinbefore, the preferred embodiment includes an alphanumeric display 5 and a numeral display 6. Assuming M locations are available in the alphanumeric display 5 and N locations in the numeral display 6. When performing an alphanumeric input operation, the preferred embodiment of this input device will be automatically set at the alphanumeric input mode, i.e. when the value of the position counter 39 is 0—(M−1), the output signal (ALPHA) 45 if the position counter 39 will be at a high level, indicating that the input device is set at an alphanumeric input mode. In the meantime, the output signal 45 is impressed across the reset pin R of flip-flop 33 through differential circuit A, causing the output Q (i.e. the input mode indication) to be at a low level for proceeding with the alphanumeric input operation. However, the above-described input mode can be changed into a numeral input mode by the keying of ALPHA 4 by the user. When the input device is set at a numeral input mode, the output value 46 from the input reset pin R of the second counter 32 is at a high level, and the output value 41 thereof is always at a 0 state. Every time a key is pressed down, the value of the output 40 of position counter 39 increases by 1, i.e. in numeral input mode, every keying operation is processed in the input device as a numeral.

On the other hand, when the value of position counter 39 is M~(M+N−1), the output value (ALPHA) 45 will be 0, and the input device will automatically set the input mode at 1, i.e. forcibly set the input device into a numeral input mode.

In addition to the above-described "circulatory" input operations (type A), other input operations can also be performed by setting position counter 39, as shown in FIG. 6, as a counter ÷3. In this condition, the output value 41 of the counter 32 is confined to 0, 1, 2, excluding 3 so that it provides another kind of "circulatory" input operation (type B), and also includes an alphanumeric input mode and a numeral input mode.

As to the input sequence of this type B operation, it is normally set to start from an alphabetic letter to a numeral (i.e. D→E→F→2). However, this sequence can be easily changed to start from a numeral to an alphabetic letter (i.e. 2→D→E→F→) by slightly changing the contents of the memory unit 42.

Figure 9:
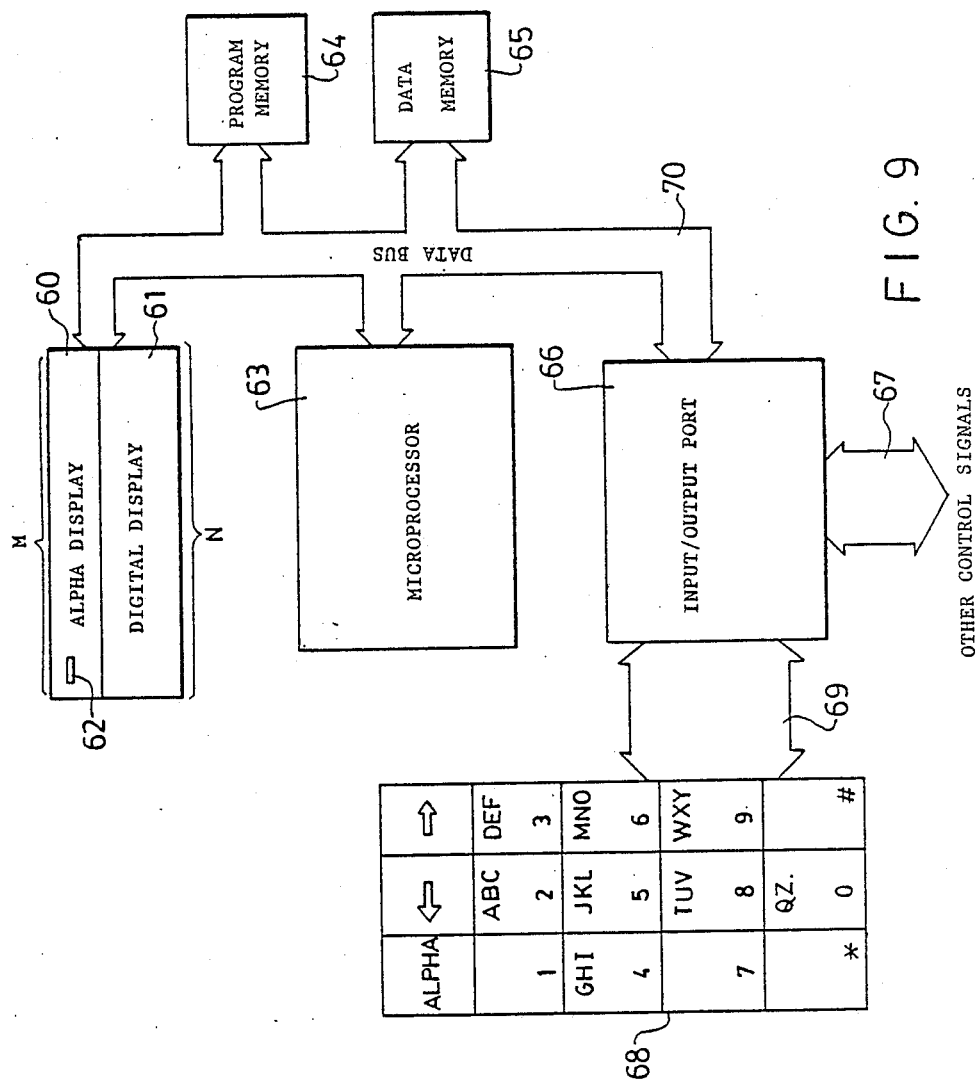
FIG. 9 is a block diagram showing an alternative example of an input circuit arrangement in connection with FIG. 5 according to this invention.

Referring to FIG. 9, there is shown an alternative example of a circuit arrangement for performing the "circulatory" input operation according to this invention. As can be seen in FIG. 9, the alternative circuit arrangement is mainly composed of a microprocessor 63, a program memory 64, a data memory 65, an input/output port 66, and other peripheral units, wherein the microprocessor 63 can be a TOSHIBA made TMPZ84C00AP 8-bit microprocessor, and the input/output port 66 can also be a TOSHIBA made TMP82C55AP, a high speed programmable input/output interface with three 8-bit I/O ports. With the known configuration of microprocessor 63 and I/O port 66, detailed circuit arrangement of the alternative example can be readily made by those skilled in the art, explanation and illustration of a detailed circuit diagram are therefore omitted for clarity.

Figure 10:
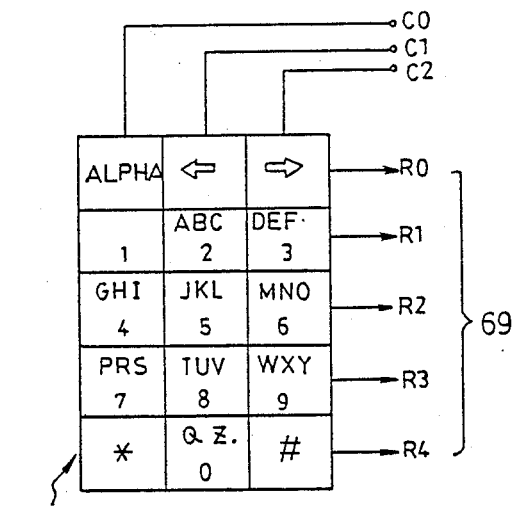
FIG. 10 is an illustrative view showing signal output conditions of FIG. 9.
Figure 11:
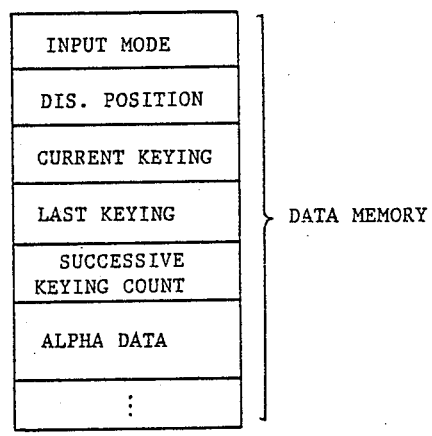
FIG. 11 is an illustrative view of a data memory unit of FIG. 9.
Figure 12:
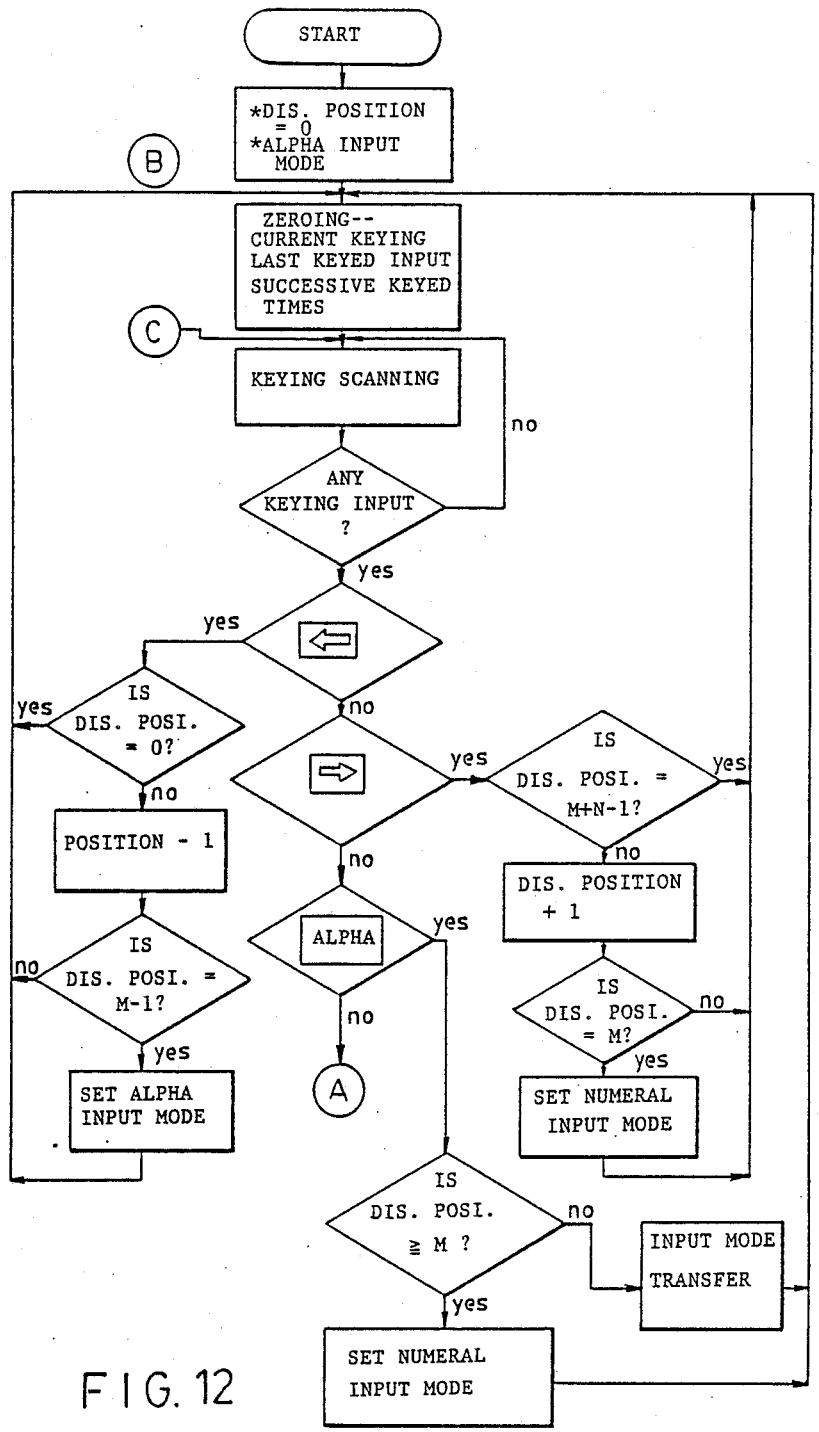
FIGS. 12 and 13b are flowcharts of an input operation of the preferred embodiments according to this invention.
Figure 13:
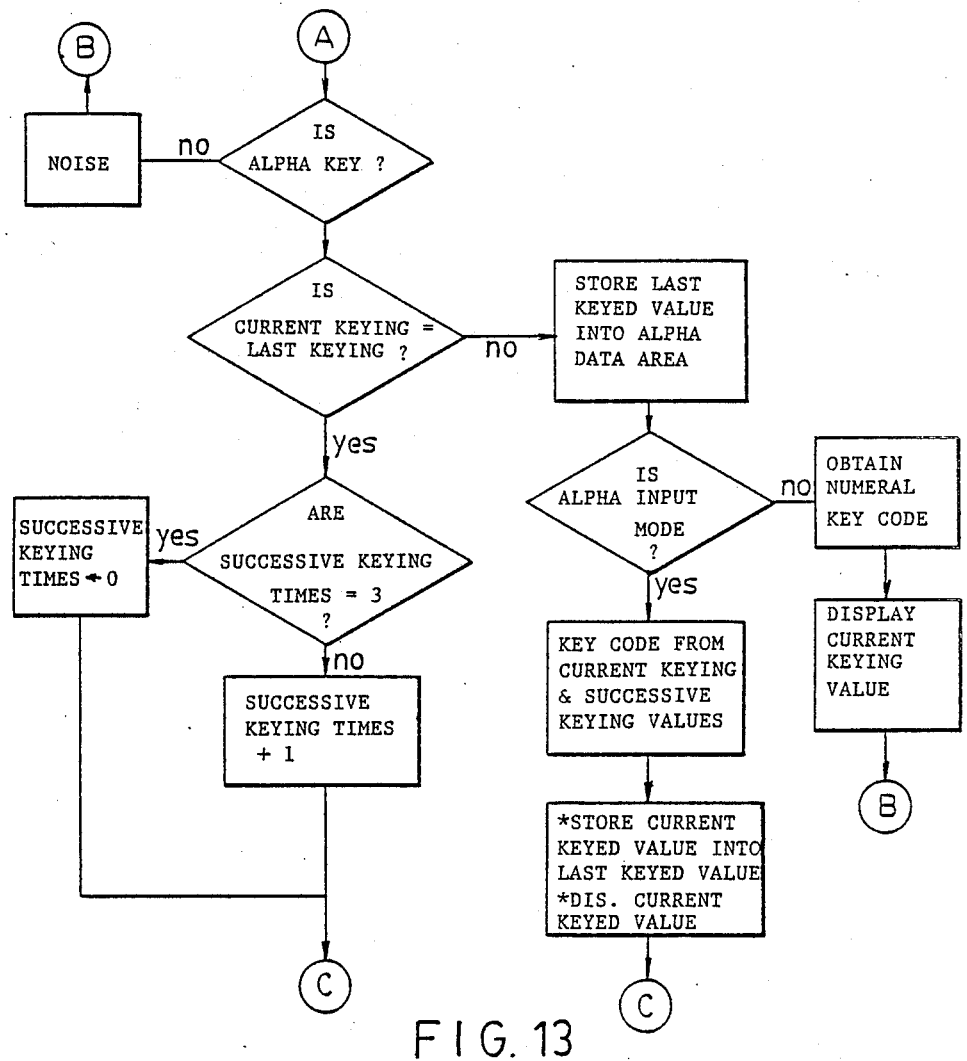

Referring to FIGS. 10, 11, 12 and 13 in connection with FIG. 9, when starting the input operation, the display of this input device is set at the first position with the value thereof equal to 0 and the input mode being alphanumeric, and the current keying and last keying as well as the successive keying operations are also set to zero. A check should then be made to see if there is any keying input. As shown in FIGS. 9 and 10, the outputs of C0, C1, C2 and R0-R4 as well as the program control 64 and the input/output ports 66 are arranged for scanning the keying operations. If there is a keyed input, it will process with the next operation; if there is no keyed input, it will keep on scanning.

After an input is keyed in, it will identify whether the keyed input is a left shift key ⬅ or a right shift key ➡. If the keyed input is a left shift key ⬅, it will subtract 1 from the display position or remain at a 0 value. In the meantime, if the keyed input is to change from the digital area into an alphabetical area, it has to change the input mode into an alphanumeric mode before it returns to point B.

If the keyed input is a right shift key ➡, it will add 1 to the display position or remain at the value of M +n−1 (the highest value). Meanwhile, if the keyed input is to change from the orginal alphabetical area into a digital area, it has to change the input mode into a numeral mode before it returns to point B.

On the other hand, if the keyed input is an ALPHA key, it will first check whether the input device is set at a numeral mode. If the input device is at the numeral mode, it will compulsively set the input device to the numeral mode again. Whereas, if the input device is not set at the numeral mode, it will change the input mode before it returns to point B.

In addition, if the keyed input does not belong to the above-mentioned three functional keys, it will check whether the keyed input is an alphanumeric key. If the result is an alphanumeric key, it will further check whether the currently keyed input is identical with the last keyed input. If the result is different, it will first store the last keyed value in an alphanumeric data area of the memory, indicating that the last keyed input is acknowledged, and then check again whether the input mode is set at the alphanumeric mode. If the result is negative, a key code will be obtained, by which the currently keyed input will be displayed before it turns to point B. Whereas, if the checked result is positive, it will obtain a key code by the currently keyed value and the successively keyed times, store the currently keyed value in the last keyed value for being used to make comparison with the next keyed-in value, and then display the currently keyed value before turning to point B. On the other hand, if the currently keyed value is identical with the last keyed value, it will set the values of the successively keyed times into an addition on the base 4, i.e. 0→1→2→3→0 for effecting the "circulatory" operation before returning to point C.

Having thus described the invention, it is to be understood that many embodiments thereof will suggest themselves without departing from the spirit and scope of the invention. Therefore, it is intended that the specification and drawings be interpreted as illustrative rather than in a limiting sense.

What is claimed is:

1. An input device for key telephone sets comprising: an input means having ordinary numeral and alphanumeric push button keys as that provided in a key telephone set for inputting telephone call information therewith, and including a plurality of control means functionally disposed in conjunction with the numeral and alphanumeric push button keys for being operated to effect "circulatory" input operations in alphanumeric and numeral modes; a plurality of display means functionally disposed in said input means in conjunction with the push button keys and said control means for displaying input mode and keyed information thereon; circuit means electrically coupled with said input means and said display means in connection with each of the numeral and alphanumeric push button keys and said control means for processing keyed information by comparing and counting operations so as to effect input mode setting and changing functions on a "circulatory" basis; so that a telephone call can be conveniently made either through numerals or alphabetical letters or through the combination of both, said circuit means comprising a first counter matched with a decoder electrically connected to the push button keys for providing an output enable to each one of the push button keys;
a pair of latches coupled with the push button keys and said control means for temporarily latching keyed input data information therein and outputting the same therefrom;
a frequency generating means electrically connected to said first counter through an AND gate for providing keying scanning signals therefrom;
a memory means coupled with said ALPHA key through a flip-flop circuit arrangement for storing keyed input data information and providing a key code therefrom;
a comparator means electrically connected between said latches and said memory means for comparing input data information from said latches and outputting compared keying information therefrom;
a second counter electrically connected to said comparator means, said control means and said memory means for providing keyed input information in effecting input mode setting and changing operations in accordance with said compared keying information from said comparator means; and
a position counter means coupled with said second counter and said control means for providing said display means with display position count information in conjunction with said comparator means.

2. An input device according to claim 1 wherein said input mode controlled by said control means includes:
a numeral input mode by which only numerals can be entered through the push button keys on a "circulatory" basis;
an alphabetical input mode by which only alphabetical letters can be entered through the push button keys on a "circulatory" basis; and
an alphanumeric input mode by which alphabetical letters an numerals can be alternatively entered through the push button keys of which each key can be operated in a "circulatory" sequence on a selective basis in conjunction with said control means.

3. An input device according to claim 1 wherein said control means comprises:
an ALPHA key functionally provided in conjunction with the push button keys and electrically coupled with said circuit means for being operated to set and change said input mode on a "circulatory" basis;
a right shift key electrically connected to said circuit means and functionally disposed in accordance with said ALPHA key and the push button keys for being operated to correct keyed input data as well as to add a space to the keyed input data in a rightward direction; and
a left shift key electrically connected to said circuit means and functionally arranged in accordance with said ALPHA key and the push button keys for being operated to correct keyed input data as well as to add a space to the keyed input data in a leftward direction.

4. An input device according to claim 2 wherein said "circulatory" sequence includes an input sequence, which can be variably changed through an operation of said ALPHA key for making an entry with the push button keys either in an alphabetical-letter-to-numeral order (such as D→E→F→2→D . . . for key $$\boxed{\begin{array}{c} DEF \\ 2 \end{array}})$$

or in an numeral-to-alphabetical-letter order (such as 2→D→E→F→2 . . . ) according to a telephone call requirement.

5. An input device according to claim 2 wherein said "circulatory" sequence further includes an input sequence, which can be controlled by said ALPHA key for making an entry with the push button keys in alphabetical letter only (such as D→E→F→D→E→ . . . ) according to a telephone call requirement.

6. An input device according to claim 1 wherein said display means includes:
an alphanumeric display functionally disposed for displaying keyed alphanumeric data thereon;
a digital display functionally disposed for displaying keyed numerals thereon; and
an input mode indictor disposed in said alphanumeric display for indicating said input mode in currrent use.

7. An input device for key telephone sets comprising: an input means having ordinary numeral and alphanumeric push button keys as that provided in a key telephone set for inputting telephone call information therewith, and including a plurality of control means functionally disposed in conjunction with the numeral and alphanumeric push button keys for being operated to effect "circulatory" input operations in alphanumeric and numeral modes; a plurality of display means functionally disposed in said input means in conjunction with the push button keys and said control means for displaying input mode and keyed information thereon; circuit means electrically coupled with said input means and said display means in connection with each of the numeral and alphanumeric push button keys and said control means for processing keyed information by comparing and counting operations so as to effect input mode setting and changing functions on a "circulatory" basis; so that a telephone call can be conveniently made either through numerals or alphabetical letters or through the combination of both, said circuit means comprising a high speed programmable input/output means electrically connected to said control means for receiving keyed input information from said control means and transferring same therefrom;

a microprocessing means coupled with said input-/output means through a data bus for processing the keyed input information received from said input/output means;

a plurality of memory means separately connected to said microprocessing means and input/output means through the data bus for storing a program and data information therein in conjunction with said microprocessing means and said input/output means; and displaying circuit means coupled with said input/output means and said memory means so as to indicate input mode setting and changing operation and displaying data information on said display means in conjunction with said input/output means.

8. An input device according to claim 7 wherein said input mode controlled by said control means includes: a numeral input mode by which only numerals can be entered through the push button keys on a "circulatory" basis;

an alphabetical input mode by which only alphabetical letters can be entered through the push button keys on a "circulatory" basis; and an alphanumeric input mode by which alphabetical letters and numerals can be alternatively entered through the push button keys of which each key can be operated in a "circulatory" sequence on a selective basis in conjunction with said control means.

9. An input device according to claim 7 wherein said control means comprises:

an ALPHA key functionally provided in conjunction with the push button keys and electrically coupled with said circuit means for being operated to set and change said input mode on a "circulatory" basis;

a right shift key electrically connected to said circuit means and functionally disposed in accordance with said ALPHA key and the push button keys for being operated to correct keyed input data as well as to add a space to the keyed input data in a rightward direction; and a left shift key electrically connected to said circuit means and functionally arranged in accordance with said ALPHA key and the push button keys for being operated to correct keyed input data as well as to to add a space to the keyed input data in a leftward direction.

10. An input device according to claim 8 wherein said "circulatory" sequence includes an input sequence, which can be variably changed through an operation of said ALPHA key for making an entry with the push button keys either in an alphabetical-letter-to-numeral order (such as D→E→F→2→D . . . for key $$\boxed{\begin{array}{c}\text{DEF}\\2\end{array}}),$$

or in a numeral-to-alphabetical-letter order (such as 1→D→E→F→2 . . . ) according to a telephone call requirement.

11. An input device according to claim 8 wherein said "circulatory" sequence further includes an input sequence, which can be controlled by said ALPHA key for making an entry with the push button keys in alphabetical letter only (such as D→E→F→D→E→ . . . ) according to a telephone call requirement.

12. An input device according to claim 7 wherein said display means includes:

an alphanumeric display functionally disposed for displaying keyed alphanumeric data thereon;

a digital display functionally disposed for displaying keyed numerals thereon; and an input mode indicator in said alphanumeric display for indicating said input mode in current use.

* * * * *